United States Patent [19]
Hamada

[11] Patent Number: 5,315,330
[45] Date of Patent: May 24, 1994

[54] PROJECTION TYPE DISPLAY APPARATUS

[75] Inventor: Hiroshi Hamada, Nara, Japan

[73] Assignee: Sharp Kabushiki Kaisha, Osaka, Japan

[21] Appl. No.: 124,431

[22] Filed: Sep. 22, 1993

Related U.S. Application Data

[63] Continuation of Ser. No. 922,669, Aug. 5, 1992, abandoned, which is a continuation of Ser. No. 631,004, Dec. 19, 1990, abandoned.

[30] Foreign Application Priority Data

Dec. 21, 1989 [JP] Japan ................... 1-333131

[51] Int. Cl.$^5$ ............................................. G03B 21/00
[52] U.S. Cl. ...................................... 353/31; 353/102; 359/40; 359/54
[58] Field of Search ................ 353/30, 31, 122, 102, 353/DIG. 3; 359/36, 40, 41, 48, 54, 55

[56] References Cited

U.S. PATENT DOCUMENTS 3,704,936  12/1972  Gorkiewicz et al. .............. 350/161
4,231,640  11/1980  Funada et al. ..................... 350/336

FOREIGN PATENT DOCUMENTS 59-7926    1/1984  Japan .
60-2916    1/1985  Japan .
60-169827  9/1985  Japan .
61-167297  7/1986  Japan .
1-103390   4/1989  Japan .

OTHER PUBLICATIONS

Japanese Laid-Open Patent Publication No. 61-140384, Laid on Aug. 30, 1986.

Primary Examiner—William A. Cuchlinski, Jr.
Assistant Examiner—William C. Dowling
Attorney, Agent, or Firm—Nixon & Vanderhye

[57] ABSTRACT

A projection type image display apparatus which includes a light source, a first optical means situated along an optical path between the light source and the transmissive display device so as to converge the light rays from the light source and enable the principal light rays to enter the transmissive display device in parallel with each other, a second optical means disposed on an opposite side to the light source with respect to the transmissive display device so as to converge the light rays from the transmissive display device, and a third optical means disposed near a rear focus of the second optical means so as to project a transmitted light image on a screen.

8 Claims, 4 Drawing Sheets

PROJECTION TYPE DISPLAY APPARATUS

This is a continuation of application Ser. No. 07/922,669, filed Aug. 5, 1992, now abandoned, which was in turn a continuation of Ser. No. 07/631,004, filed Dec. 19, 1990, now abandoned.

BACKGROUND OF THE INVENTION

1. Field of the invention

The present invention relates generally to an image display apparatus, and more particularly to a projection type image display apparatus for displaying a projected image through lenses from a transmissive display device such as liquid crystal panels.

2. Description of the Prior Art

In recent years, projection type display apparatus are widely used to display on large-screen projection televisions, information display systems and the like. FIG. 6 illustrates a typical example of such a projection type of display apparatus 1, hereinafter being referred to as a display apparatus. The display apparatus 1 includes a light source 2 and a reflector lens 3 so that the light from the light source 2 is focused by a condenser lens 4 so as to form an image. A projection lens 7 is disposed adjacent to the image.

A transmissive display device 6 such as a liquid crystal device is disposed between the condenser lens 4 and the projection lens 7. The display device 6 includes layers which independently control the transmission of red, green and blue. The condenser lens 4 allows the light from the source 2 to enter the display device 6, and the pasing light is then projected into an image on a screen 8. The reason why the projection lens 7 is located near the image of the light source 2 is to minimize the diameter of the projection lens 7. This system is called "Kohler's illumination".

Since this system has a structure in which the light through the condenser lens 4 is necessarily focused on the condenser lens 7, the angle of incidence to the display device 6 differs with positions of incidence thereon. In FIG. 6 the angles $\theta 1$ and $\theta 2$ have different values. If a plurality of display devices 6R, 6G and 6B are layered as shown in FIG. 6, a "parallax" is likely to occur from one display device to another. As a result, the images represented on the respective display devices 6R, 6G and 6B do not connect to each other on a screen 8, thereby causing chromatic aberration. It is generally explained that this problem is derived from varying projecting magnifications due to different distances between the display devices 6R, 6G and 6B and the projection lens 7.

In order to solve the problems discussed above, there are proposals, among which Japanese Laid-open Patent Publication 60-2916 discloses a method for irradiating a display panel with parallel light rays. This prior art discloses an optical system under which a liquid crystal panel is irradiated with parallel light rays so as to enable a pair of projection lenses to project an image onto the screen. This known method requires a projection lens having a larger diameter than that of the display panel, thereby resulting in an increased production cost and an increased size. In addition, if this optical system has a projection lens constructed with single lenses, a large chromatic aberration is likely to occur. As a result, some suitable means must be provided so as to obviate the possibility of the chromatic aberration, thereby resulting in an increased size and an increased production cost.

SUMMARY OF THE INVENTION

The display apparatus of this invention, which overcomes the above-discussed and numerous other disadvantages and deficiencies of the prior art, comprises a light source, a first optical means situated along an optical path between the light source and the transmissive display device so as to converge the light rays from the light source and enable the principal light rays to enter the transmissive display device in parallel with each other, a second optical means disposed on an opposite side to the light source with respect to the transmissive display device so as to converge the light rays from the transmissive display device, and a third optical means disposed near a rear focus of the second optical means so as to project a transmitted light image on a screen.

In a preferred embodiment, the transmissive display device comprises a pair of simple matrix liquid cells multi-layered in a direction in which light rays are passed.

In another preferred embodiment, each liquid crystal cell has scanning lines arranged at predetermined pitches such that the scanning lines in one liquid crystal cell are not overlapped with those in the other liquid crystal cell in a direction in which light rays are passed.

In a further preferred embodiment, the transmissive display device comprises three liquid crystal cells multi-layered in a direction in which light rays are passed.

In a still further embodiment, the liquid crystal cells change the transmission of light components corresponding to red, green and blue, respectively.

Thus, the invention described herein makes possible the objects of (1) providing a projection type display apparatus capable of displaying a clear image picture on a screen without the possibility of having an image discontinuity and/or chromatic aberration, and (2) providing a projection type display apparatus of a relatively small and economical size.

BRIEF DESCRIPTION OF THE DRAWINGS

This invention may be better understood and its numerous objectives and advantages will become apparent to those skilled in the art by reference to the accompanying drawings as follows.

DESCRIPTION OF THE PREFERRED EMBODIMENT

Figure 1:
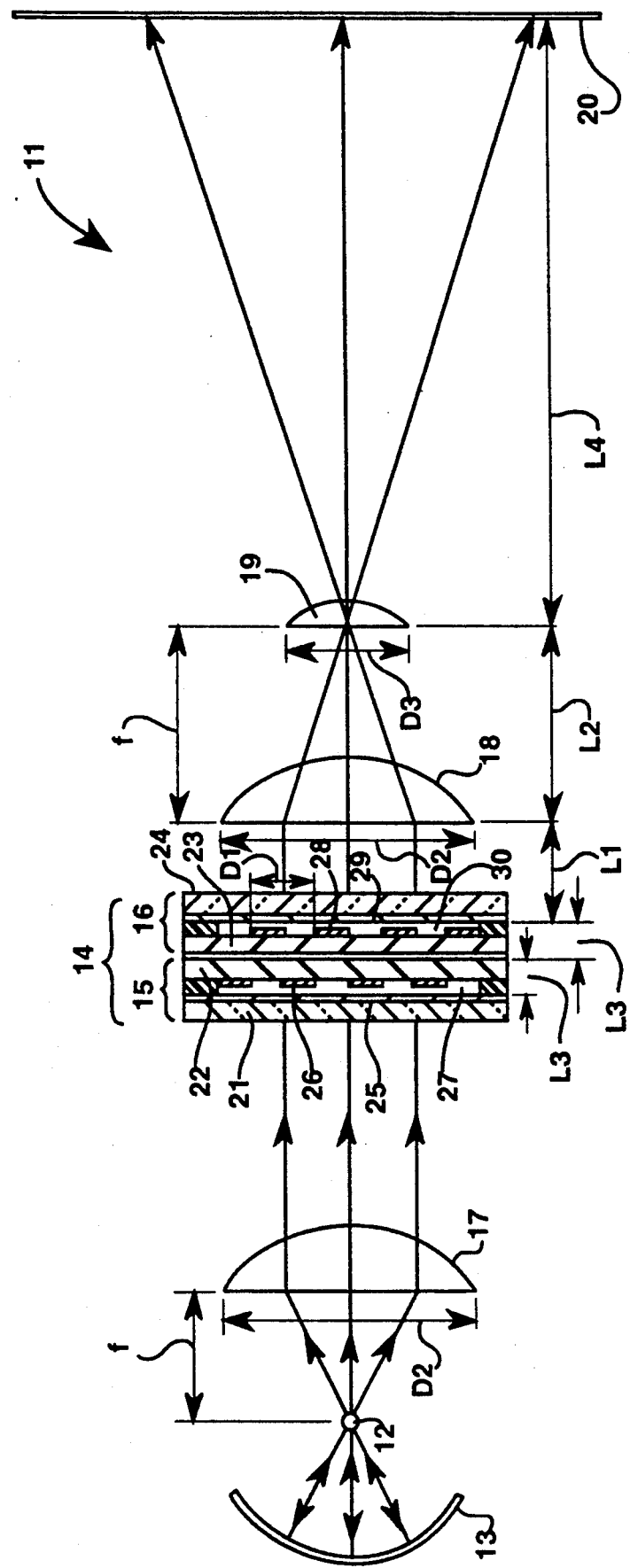
FIG. 1 is a diagrammatic view exemplifying an example of the display apparatus according to the present invention.

Referring to FIG. 1, a display apparatus 11 includes a light source 12 and a reflector mirror 13 (hereinafter referred to as the "reflector") wherein a halogen lamp, a metal halide lamp, or a xenon lamp is employed as the light source 12. The reflector 13 having a spherical surface reflects light rays from the light source 12 so as to enable the principal light rays to flow toward the display device 14 in parallel with each other through a condenser lens 17 as a first optical means. The light rays passing through the display device 14 are passed through a field lens 18 as a second optical means whereby they are focused on a projection lens 19 as a third optical means located in front of the field lens 18. The projection lens 19 projects the image of the display device 14 on the screen 20 as a picture. The projection optical means is constructed so as to include the field lens 18 and the projection lens 19.

The second optical means can be constructed in the form of a double convex lens, a plano-convex lens or a meniscus lens, and it is designed so that the chromatic aberration is minimized as a whole by combining with the third optical means. The second optical means is constructed with a single lens or a complex lens such as acromat or apochrocoat. The third optical means can be constructed with a usual projection lens for use in an ordinary slide projector or a camera, and where required, a plurality of lenses can be arranged so that the relative positions of them are adjusted so as to work as a zoom lens which has varied synthetic focal lengths.

The display device 14 does not illuminate by itself but has an optical transmissibility varying in response to a driving signal, thereby representing letters and/or pictures by modulating the intensity of an incident light from the light source 12. The display device 14 can be constructed with a liquid crystal, an electro-chrome, or a transmissive ceramic such as PLZT. The following example uses a liquid crystal.

The liquid crystal panel can be either a simple matrix system or, alternatively, an active matrix system under which a non-linear two-terminal element such as MIM (metal-insulating layer-metal) or three-terminal switching element such as TFT (thin film transistor) is placed. In the illustrated example a pair of liquid crystal panels 15 and 16 of a simple matrix system are employed so as to increase the capacity for display on the simple matrix system. Under the display device of a simple matrix system crosstalk is likely to occur in accordance with an increase in the scanning lines. In the TN mode about 100 scanning lines are a limitation, and in the STN mode 200 scanning lines are a limitation. In this example each liquid crystal panels 15 and 16 is provided with half the number of scanning lines required for obtaining an optimum display capacity such that neither liquid crystal panel shares the scanning lines of the other. This increases the capacity for display without reducing contrast.

The liquid crystal panels 15 and 16 are provided with substrates 21 and 22, and 23 and 24 of a transmissive material such as glass. In the example, 640 data lines 25 and 200 scanning lines 26 are sandwiched between the substrates 21 and 22. A super twisted nematic liquid crystal layer 27 is sandwiched between the two groups of lines 25 and 26. The substrate 22 of liquid crystal panel 15 is located adjacent to the substrate 23 of the display device 16. Two-hundred scanning lines 28 and 640 data lines 29 are provided, between which a liquid crystal layer 30 of the same material as the liquid crystal layer 27 is sandwiched. The scanning lines 26 and 28 are located such that each group of lines do not overlap the other group of lines in the direction of the thickness of the display device 14. The pitch D1 (picture element pitch) between the scanning lines 26 and 28, and the data lines 25 and 29 is 100 $\mu$m.

The condenser lens 17 and the field lens 18 are constructed by arranging plano-convex lenses each having a focal length of 200 mm and a diameter D2 of 100 mm as shown in FIG. 1. The projection lens 19 is constructed with a plano-convex lens having a focal length of 200 mm and a diameter D3 of 40 mm.

The light rays from the light source 12 enter the display device 14 as parallel beams by the reflector 13 and the condenser lens 17. The incidence light is modulated in response to a picture signal input to the liquid crystal panels 15 and 16. The light rays are directed by the field lens 18 to the projection lens 19. Suppose that the distance L1 between the liquid crystal panel 16 and the field lens 18 is 40 mm, and the distance L2 between the field lens 18 and the projection lens 19 is 200 mm. As a result, a virtual image of the liquid crystal panel 16 is projected through the field lens 18, and the virtual image is enlarged on the screen 20 five times as large as the size of the liquid crystal panel 16, wherein the screen 20 is located a distance L4 (1,000 mm) in front of the projection lens 19.

If the distance L2 between the field lens 18 and the projection lens 19 is 170 mm, the virtual image is enlarged at a distance L4 (for example, 2,200 mm) from the projection lens 19 about 10 times the size of panel 16. These distances are those which ensure that the image on the screen 20 is focused. if the distance L2 is kept 200 mm, the focusing of the image is maintained irrespective of various distances L1.

If the image on the screen 20 is focused by the projection lens 19 at a middle point between the layers of the liquid crystal panel 15 and 16 in the direction of thickness, the images of the liquid crystal layers 27 and 30 on the screen 20 become out of focus by the thicknesses of the substrates 22 and 23 (L3=1.1 mm).

When the refractive index n of each of the substrates 21 to 24 is 1.53, and the thickness L3 of the substrate is expressed in terms of the distance L3a in air, the following equation is established:

$$L3a = L3/n = 1.1/1.53 \approx 0.72 \text{ [mm]} \tag{1}$$

In this example the focal depth depends upon the degree of parallelism of the light rays from the light source 12.

Figure 2:
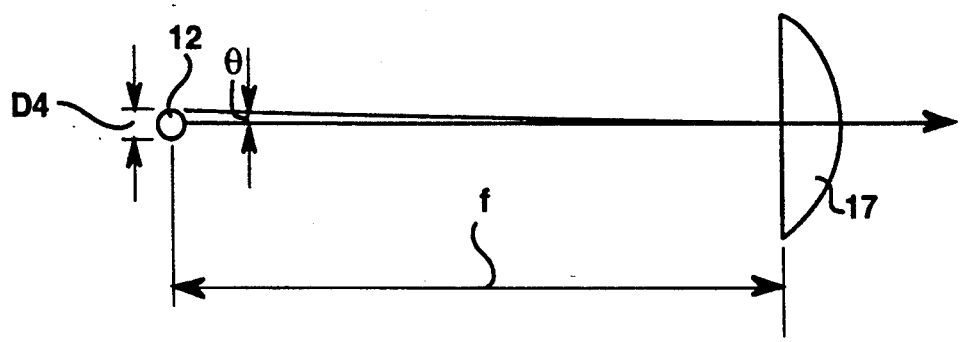
FIG. 2 is a diagrammatic view exemplifying the degree of parallelism of light rays from a light source.

FIG. 2 shows the degree of parallelism of the light rays from the light source 12. Suppose that the illuminating section of the light source 12 has a diameter D4 of 10 mm, and the condenser lens 17 has a focal length f of 200 mm, the degree of parallelism (tan $\theta$) of the light rays from the light source 12 is expressed by:

$$\tan \theta = \pm \left(\frac{D4}{2}\right)/f = \pm \frac{5}{200} = \pm 0.025 \tag{2}$$

When the projection lens 17 is focused at a point between the liquid crystal panels 15 and 16, the image of the liquid crystal layers 27 and 30 becomes out of focus expressed as the following formula:

$$0.72 \text{ [mm]} \times 0.025 = 0.018 \text{ [mm]} \tag{3}$$

It is ascertained that this out-of-focus condition is negligible for viewers who view the image picture on the screen 20.

In contrast, when the field lens 18 was removed from the structure shown in FIG. 1, and projection was carried out only through a plano-convex lens having a focal length of 200 mm and a diameter of 100 mm, a large chromatic aberration occurred. Under the present invention the light rays from the light source 12 are arranged so as to enable the principal rays to enter the display device 14 in parallel. As a result, the above-discussed detrimental discontinuity of the image due to the magnifications deferring with the liquid crystal panels is avoided, thereby enhancing the quality of the image picture on the screen.

Figure 3:
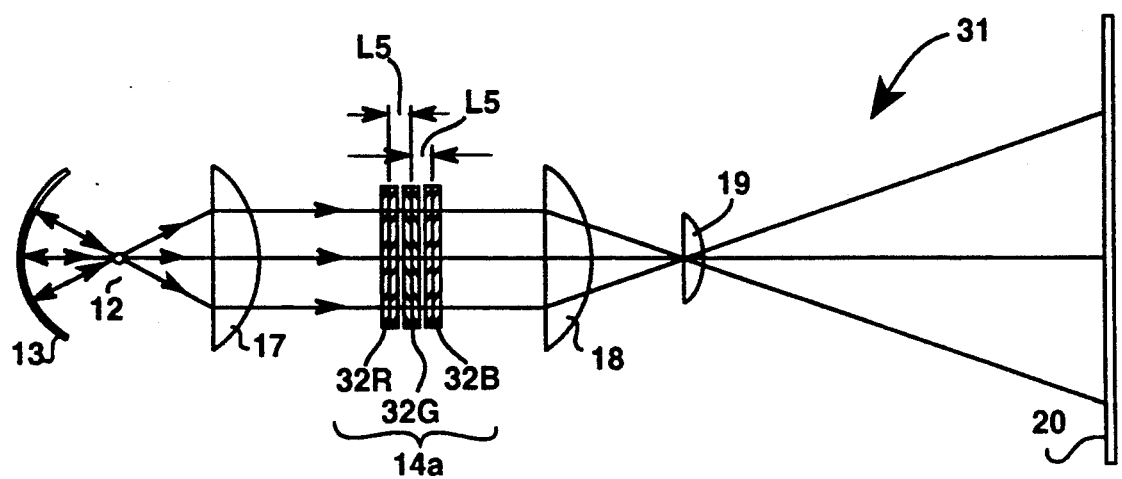
FIG. 3 is a diagrammatic view exemplifying a second example of the display apparatus according to the present invention.

Referring to FIG. 3, a modified version of the display apparatus 31 will be described, wherein like numerals refer to like and corresponding parts in the first example:

A striking feature of this example is that a display device 14a includes three liquid crystal panels 32R, 32G and 32B, each of which can have the same structure as that of the liquid crystal panel 15, or, alternatively, can be a single three-layered structure in which the laminated layers are separated by transmissive substrates.

The display 31 is designed to display a chromatic image, and the liquid crystal panels 32R, 32G and 32B change the transmission of light components corresponding to red, green and blue so as to display a chromatic image. In addition, dichromatic pigments are dissolved in the respective liquid crystal panels 32R, 32G and 32B so as to control the molecular orientation by voltage. In this way the absorbency of light components corresponding to red, green and blue. This system is commonly called the "Guest Host Mode", hereinafter referred to as "GH Mode". It is preferable to incorporate this GH Mode in this example.

Under the GH Mode, in order to secure an optimum brilliancy of an image picture on the screen 20, it is preferable that the light rays are not absorbed if they have wavelengths out of the range in which absorbency is controlled. This means that the pigments used become complementary colors for the controlled colors. More specifically, if liquid crystal panels 32R, 32G and 32B are to control red, green and blue, color agents of cyan, magenta and yellow are used. In controlling the red color component from minimum to maximum, the liquid crystal panel 32R using the cyan color agent changes between cyan and clear.

Preferably the liquid crystal panel 32G containing the magenta pigment for controlling the green light is situated between the liquid crystal panels 32R and 32B. This is based on the accepted observation that the human eye has the highest sensitivity and space resolving power to green. Consequently, the focus is placed in the liquid crystal panel 32G situated between the other two panels 32R and 32B, thereby intensifying the visual resolving power of the human eye.

Dimensions of components of the display device 14a are as follows:

The diagonal length of the display screen is 75 mm, and the pixel pitch is 190 $\mu$m (longitudinal)$\times$161 $\mu$m (lateral), the pixel area 88 $\mu$m (longitudinal)$\times$104 $\mu$m (lateral), and the porosity is 30%. The liquid crystal panels 32R, 32G and 32B have the same structure as that of the liquid crystal panel 15 in the first example, and the distances L5 between the adjacent two panels L5 are equal to the thickness of the combined two substrates 21 and 24 in FIG. 1, that is:

$$1.1 \text{ [mm]} \times 2/1.53 \approx 1.44 \text{ [mm]} \qquad (4)$$

If the degree of parallelism of the light from the light source 12 is determined to be equal to that of the first example, the out-of-focus condition occurs in each of the liquid crystal panels 32R and 32B, whose degree is expressed by:

$$1.44 \text{ [mm]} \times 0.025 = 0.036 \text{ [mm]} \qquad (5)$$

This degree of out-out-focus is smaller than the pixel area mentioned above, and negligible for viewers who view the image picture on the screen.

This example achieves the same effects as those resulting from the first example.

Figure 4:
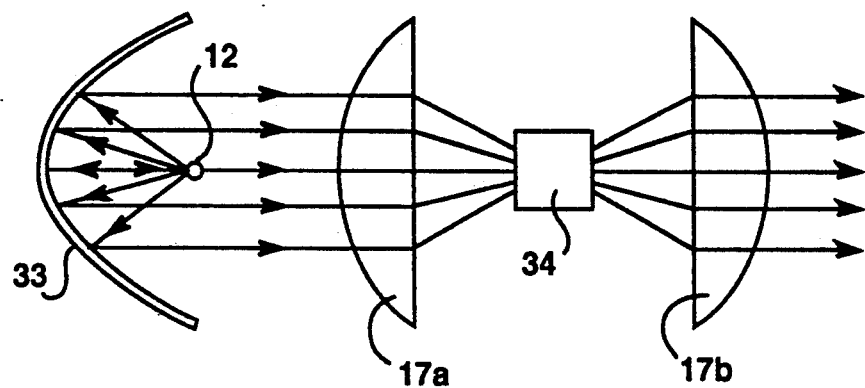
FIG. 4 is a diagrammatic view exemplifying a third example of the display apparatus according to the present invention.

Referring to FIG. 4, a further modified example will be described, wherein like numerals refer to like and corresponding parts in the first and second examples:

The main difference from the first and second examples is that the reflector 13 has a rotary parabolic mirror 33 which makes the light rays from the light source 12 parallel. The parallel light rays are converged by a condenser lens 17a, and an integrator 34 is disposed near the focus where the light rays are converged so as to distribute the light rays evenly. The light rays from the integrator 34 are made parallel by the condenser lens 17b, and are radiated onto the display devices 14 of the first example or the display device 14a of the second example. This example achieves the same effects as those of the first and second examples.

Figure 5:
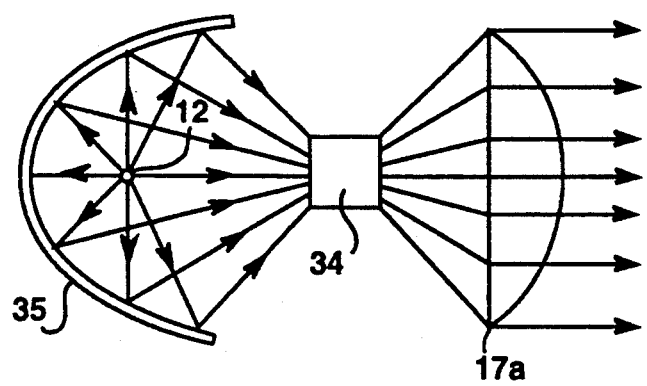
FIG. 5 is a diagrammatic view exemplifying a fourth example of the display apparatus according to the present invention.
Figure 6:
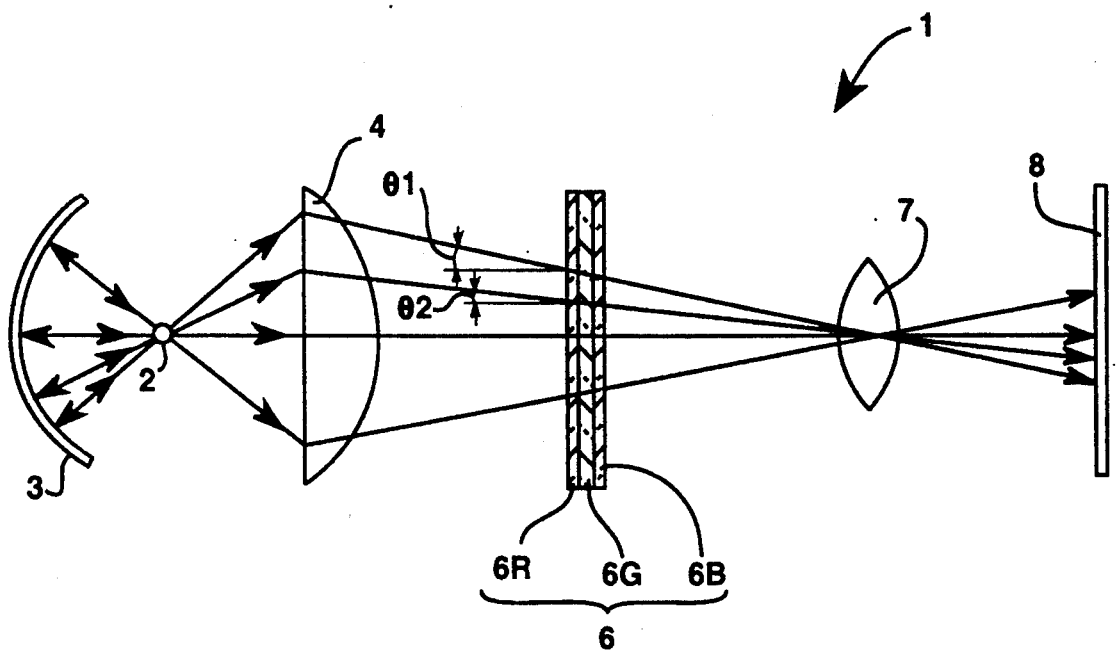
FIG. 6 is a diagrammatic view exemplifying a typical conventional display apparatus.

Referring to FIG. 5, another modified example will be described, wherein like numerals refer to like and corresponding parts in the above-mentioned examples:

A notable feature resides in the provision of a rotary elliptical mirror 35 as the reflector, which converges the light rays from the light source 12 situated at a first focus are converged at a second focus where the integrator 34 is disposed so as to distribute the light rays evenly. The light rays from the integrator 34 are made parallel by the condenser lens 17 and led to the display device 14a. This example achieves the same effects as those resulting from the above-mentioned examples.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A projection type image display apparatus which displays an image picture on a screen by projecting light rays, the display apparatus comprising a transmissive display device, a light source, a first optical means situated along an optical axis between the light source and the transmissive display device so as to project the light rays from the light source and enable the principle light rays to enter the transmissive display device in parallel along the optical axis, a second optical means disposed on an opposite side to the light source with respect to the transmissive display device so as to project the light rays from the transmissive display device, and a third optical means disposed near a rear focus of the second optical means so as to project a transmitted light image through the display device on a screen, the transmissive display device comprising a pair of simple matrix liquid cells multi-layered in a direction in which light rays are passed, each of the simple matrix liquid cells being provided with scanning lines on its inner surface of the substrate so that the scanning lines of each cell are staggered with respect to each other, the scanning lines being arranged at predetermined pitches such that the width of the pitches is larger than an out-of-focus distance determined by the product of the degree of parallelism of the first optical means and the total optical thickness of the two substrates of the pair of matrix cells.

2. A projection type image display apparatus which displays an image on a screen by projecting light rays, the display apparatus comprising:

a transmissive display device including three display cells multi-layered in a direction in which light rays are passed through the device;

a light source;

a first optical means situated along an optical axis between the light source and the transmissive display device so as to project the light rays from the light source and enable the principle light rays to enter the transmissive display device in parallel along the optical axis;

a second optical means disposed on an opposite side to the light source with respect to the transmissive display device so as to project the light rays from the transmissive display device; and a third optical means so as to project a transmitted light image through the display device on a screen, wherein a middle one of the three display cells contains magenta pigment for controlling a green light component, the image display apparatus being focussed in the middle display cell, thereby intensifying a visual resolving power of a human eye for image displayed on the screen.

3. A projection type image display apparatus which displays an image on a screen by projecting light rays, the display apparatus comprising:

a transmissive display device comprising an array of pixels provided by a plurality of display cells multi-layered in a direction in which light rays are passed through the device, each display cell comprising two substrates disposed on respective sides of a display plane of the cell;

a light source;

a first optical means situated along an optical axis between the light source and the transmissive display device so as to project the light rays from the light source and enable the principle light rays to enter the transmissive display device in parallel along the optical axis;

a second optical means disposed on an opposite side to the light source with respect to the transmissive display device so as to project the light rays from the transmissive display device; and a third optical means so as to project an image transmitted through the display device on a screen, wherein a degree of out-of-focus (OFD) is equal to or smaller than a pitch of the pixels of the transmissive display device, the degree of out-of-focus being defined by:

$$OFD = (T/n) \times [(D4/2)/f]$$

where T is a thickness or a total thickness of the substrate or substrates of the transmissive display device between a focal plane by the third optical means in the display device and the display plane of each display cell, n is a refractive index of the substrate or substrates, D4 is a diameter of an illuminating section of the light source, and f is a focal length of the first optical means.

4. A projection type image display apparatus according to claim 3, wherein the display cells are simple matrix liquid crystal cells, each of the simple matrix liquid crystal cells being provided with scanning lines, the scanning lines of each cell being staggered with respect to each other.

5. A projection type image display apparatus according to claim 3, wherein the display cells are active matrix liquid crystal cells, each of the active matrix liquid crystal cells being provided with picture element electrodes as display electrodes.

6. A projection type image display apparatus according to claim 3, wherein the transmissive display device comprises three display cells multi-layered in direction in which light rays are passed.

7. A projection type image display apparatus according to claim 6, wherein the display cells change the transmission of light components corresponding to cyan, magenta and yellow, respectively.

8. A projection type image display apparatus according to claim 7, wherein the display cells are Guest Host Mode liquid crystal cells.

* * * * *